United States Patent [19]

Dresden III et al.

[11] Patent Number: 5,842,376

[45] Date of Patent: Dec. 1, 1998

[54] SYSTEM AND METHOD FOR DECREASING RATIO CHANGING TIME BY ACTUATING INERTIA BRAKE WHILE THE MASTER CLUTCH IS ENGAGED IN ELECTRONICALLY ENHANCED POWERTRAIN SYSTEMS

[75] Inventors: John Dresden III, Farmington Hills; Thomas A. Genise, Dearborn, both of Mich.; Simon Hornby, Bolton Lancashire, England; Ronald K. Markyvech, Allen Park, Mich.; Richard A. Nellums, Farmington Hills, Mich.; John E. Stainton, Chorley, England

[73] Assignee: Eaton Corporation, Cleveland, Ohio

[21] Appl. No.: 784,985

[22] Filed: Jan. 17, 1997

Related U.S. Application Data

[62] Division of Ser. No. 461,715, Jun. 5, 1995, Pat. No. 5,655,407.

[51] Int. Cl.⁶ ............................ F16H 59/00; F16H 61/00; F16D 67/00

[52] U.S. Cl. ............................ 74/336 R; 192/4 A; 477/86; 477/92; 477/124

[58] Field of Search ...................... 477/86, 92, 94, 477/107, 120, 124; 74/335, 336 R; 192/4 A

[56] References Cited

U.S. PATENT DOCUMENTS

| | | | |
|---|---|---|---|
| 3,548,980 | 12/1970 | Schmidt et al. | 477/94 X |
| 3,834,499 | 9/1974 | Candellero et al. | 477/94 X |
| 4,361,060 | 11/1982 | Smyth | 74/336 |
| 4,544,057 | 10/1985 | Webster et al. | 477/86 |
| 4,648,290 | 3/1987 | Dunkley et al. | 74/336 |
| 4,785,917 | 11/1988 | Tateno et al. | 192/0.08 |
| 4,787,044 | 11/1988 | Nagata et al. | 364/431.07 |
| 4,933,850 | 6/1990 | Wheeler | 477/92 X |
| 4,961,484 | 10/1990 | Kato et al. | 192/3.31 |
| 5,053,961 | 10/1991 | Genise | 364/424.1 |
| 5,053,962 | 10/1991 | Genise | 364/424.1 |
| 5,121,723 | 6/1992 | Stepper et al. | 123/322 |

(List continued on next page.)

FOREIGN PATENT DOCUMENTS

| | | |
|---|---|---|
| 0427000 | 12/1990 | European Pat. Off. . |
| 0270708 | 5/1991 | European Pat. Off. . |
| 2154235 | 4/1973 | France . |

OTHER PUBLICATIONS

*Powertrain Electronics—Progress On The Use and Development of the Computer Aided Gearshift Systems*, Christian Bader, Mercedes–Benz AG, pp. 375–385.

*Electrically Controlled Mechnical Automatic Transmission for Heavy Duty Trucks and Buses*, S. Tanaka, F. Momiyama, M. Terasawa, & S. Innami, Hino Motors, Ltd., pp. 161–169.

SAE Technical Paper Series, *Automated Mechanical Transmission Controls*, Nov. 7–Oct. 1983.

Proc. Instn. Mechn. Engrs., vol. 199, No. D4, *A New Concept Of Truck Transmission*.

Truck, Mar. 1993.

*Scania CAG—Computer–Aided Gearshifting*, Hal Holmelius, Saab–Scania AB Sweden.

Commerical Motor, UK *Has To Wait For Geartronic Debut*, 26 Sep.–2 Oct. 1991, p. 8.

Commercial Motor, *Shifting With More Brains*, 19–25 Sep. 1991.

Primary Examiner—Khoi Q. Ta
Attorney, Agent, or Firm—Brooks & Kushman P.C.

[57] ABSTRACT

A system and method for decreasing the time required to complete a ratio change in an electronically enhanced powertrain system is provided. The powertrain system includes a number of devices for providing a retarding torque to engine rotation to increase the decay rate of the engine speed during an upshift. These devices include an engine brake and an input shaft brake. A retarding torque is also provided by increasing engine accessory load by controlling various engine accessories such as a cooling fan, an air compressor, a hydraulic pump, an air conditioning compressor, and an alternator.

7 Claims, 3 Drawing Sheets

U.S. PATENT DOCUMENTS

| | | | |
|---|---|---|---|
| 5,186,291 | 2/1993 | Hedstrom et al. | 192/4 A X |
| 5,291,979 | 3/1994 | Lizuka | 192/0.092 |
| 5,362,285 | 11/1994 | Sano et al. | 477/92 |
| 5,393,276 | 2/1995 | White et al. | 477/91 |
| 5,568,748 | 10/1996 | Carlson et al. | 477/120 X |
| 5,609,548 | 3/1997 | White et al. | 477/124 |
| 5,638,271 | 6/1997 | White et al. | 477/107 X |
| 5,679,093 | 10/1997 | Desaultels et al. | 477/109 |

SYSTEM AND METHOD FOR DECREASING RATIO CHANGING TIME BY ACTUATING INERTIA BRAKE WHILE THE MASTER CLUTCH IS ENGAGED IN ELECTRONICALLY ENHANCED POWERTRAIN SYSTEMS

CROSS REFERENCE TO RELATED APPLICATIONS

This application is a divisional of application U.S. Ser. No. 08/461,715, filed Jun. 5, 1995, now U.S. Pat. No. 5,655,407.

TECHNICAL FIELD

The present invention relates to a system and method for decreasing the time required to complete a ratio change in an electronically enhanced engine and transmission system.

BACKGROUND ART

Electronically enhanced transmission systems have been well developed in the prior art as may be seen by reference to U.S. Pat. Nos. 4,361,060; 4,595,986; 4,648,290; 4,722,248; and 5,050,427, the specifications of which are hereby incorporated by reference in their entirety. Transmission systems such as these have been utilized to provide a variety of gear ratios to enhance the flexibility and torque multiplication of an engine to service a plethora of applications. The most common applications include MVMA Class 7 and Class 8 tractor semi-trailer vehicles although other applications, such as automobile or stationary power plant powertrains, may also be serviced.

An electronic control module which includes a microprocessor is often used to control the powertrain, which includes an engine as well as a multiple gear ratio transmission. The continuous evolution of microprocessor technology has enabled increased accuracy and expanded the scope of control over engine and transmission operations. The electronic control module collects data from various sensors and issues commands appropriate for the current operating conditions to control the engine and transmission. Engine control may include modulating fuel, operating engine accessories, or managing application of an engine brake or driveline retarder. Transmission control may include selection of an appropriate gear ratio, including disengagement of the current gear ratio and engagement of a new target gear ratio, or operation of an input shaft brake.

Efficient ratio changing improves fuel economy and enhances drivability of a vehicle. Under certain demanding situations, such as when negotiating a steep grade with a heavily loaded vehicle, swift ratio changes are required to prevent the vehicle from losing momentum and missing entirely the window of opportunity to complete the shift. Under normal driving conditions, an operator may have to shift gears more than fifteen times before reaching highway speeds. In these applications, inefficiency in ratio changing may accumulate to a significant amount of wasted time. Thus, it is desirable to reduce the time necessary to complete a ratio change or shift.

A typical ratio change involves a number of steps. First, the operator must interrupt the transfer of torque from the engine through the transmission to the driveline. This may be accomplished by disengaging a master clutch which provides a frictional coupling between the engine and the transmission. Alternatively, a "throttle dip" may be performed where the throttle is abruptly decreased. Once the torque transfer has been interrupted, the current gear is disengaged and the transmission is in a neutral state.

The next step in a typical ratio change involves selecting the target gear ratio. This may be the next available gear ratio in a sequence, or a number of available ratios may be skipped, depending on the current operating conditions. Before engaging the target gear, the transmission input shaft should rotate at a substantially synchronous speed for the current output shaft speed and target gear ratio. When the master clutch is engaged, the input shaft speed may be controlled by controlling engine speed since the engine and transmission are coupled. Engine speed may be increased (for a downshift) or decreased (for an upshift) to realize synchronous speed. On transmissions equipped with an input shaft brake, the input shaft speed may be reduced by disengaging the master clutch and applying the input shaft brake (also known as an inertia brake or clutch brake). However, input shaft brakes with sufficient capacity to decrease ratio changing time add cost and complexity to the transmission system and require accurate sequencing of events for satisfactory operation, so many transmissions only utilize simple versions of these devices.

For transmissions without input shaft brakes, synchronous speed will not be attained with the master clutch engaged on an upshift until the engine speed naturally decays to synchronous. As engines become more and more efficient, the reduction of internal frictional losses results in a substantially lower natural engine decay rate. This results in a correspondingly longer time to complete a ratio change. Thus, it is desirable to increase engine deceleration during an upshift to achieve synchronous speed shortly after disengagement of the current gear.

A device often utilized to provide a variable retarding force to an engine, is an engine brake. The most common engine brakes may be either engine compression brakes or exhaust brakes. These devices are well known in the prior art and are commonly provided on heavy-duty vehicles. Examples of vehicular automated mechanical transmission systems utilizing engine brakes may be seen by reference to U.S. Pat. Nos. 4,933,850 and 5,042,327 the specifications of which are hereby incorporated by reference in their entirety.

Engine compression brakes are usually manually operated and provide a variable retarding force resisting engine rotation by altering valve timing of one, two, or three banks of cylinders. This creates compressive force within the cylinders which resists rotation of the crankshaft. Exhaust brakes operate in a similar fashion by restricting exhaust flow from the engine. Exhaust brakes do not offer the responsiveness or flexibility of engine compression brakes although they are less expensive to employ.

Traditionally, engine brakes are utilized to assist the vehicle service brakes by supplying a resisting torque on the driveline when descending long grades. Manual operation of the engine brake in these situations continues to be a desirable option. More recently, engine brakes have been manually operated to decrease the time required for ratio changes. For this application, manual operation of the engine brake often results in large torque disturbances to the vehicle driveline due to inappropriate timing in applying and releasing the engine brake. This reduces drivability of the vehicle and may also adversely affect the durability of powertrain components. Furthermore, proper operation is largely dependent upon the skill and experience of the vehicle operator.

SUMMARY OF THE INVENTION

It is, therefore, an object of the present invention to provide a system and method for reducing the time required to complete a ratio change, in particular, an upshift ratio change, in a manual, semi-automatic or fully automatic transmission.

It is an additional object of the present invention to provide a system which reduces the time required to achieve synchronous speed by increasing a retarding force acting on engine rotation.

Another object of the present invention is to provide a system which automates control of an engine compression brake to decrease ratio changing time in a manual, semi-automatic or fully automatic transmission.

A still further object of the present invention is to provide a system which increases engine load to supply a variable retarding force so as to improve ratio changing times in a manual, semi-automatic or fully automatic transmission.

Yet another object of the present invention is to provide a system which reduces driveline disturbances during an upshift by utilizing an engine brake when a transmission neutral condition is sensed.

In carrying out the above object and other objects and features of the present invention, a control system is provided for reducing the ratio changing time of a mechanical transmission system. The transmission system includes an engine selectively coupled by a master friction clutch to a mechanical change gear transmission. The system also includes an electronic control unit for receiving a plurality of input signals to determine an engine speed, an output shaft speed, and a neutral gear state of the transmission. The electronic control unit also generates command signals for controlling the engine, the transmission, and associated accessories components. The transmission includes a plurality of gear ratio combinations, and a neutral gear state, selectively engageable between a transmission input shaft and a transmission output shaft. The control system may utilize a sensor for sensing the neutral gear state which occurs after disengaging a current gear ratio and before effecting a target gear ratio in the transmission. Alternatively, a neutral state may be determined based on transmission input speed and output speed, as known in the art. The system also includes devices for applying a retarding torque in response to a command from the electronic control unit. The retarding torque is applied while the engine speed is above the synchronous speed at which the target gear ratio is effected, to increase engine deceleration and reduce ratio changing time.

A method is also provided for use with the system and similar systems, including an engine coupled via a master friction clutch to a mechanical change gear transmission having a plurality of gear ratio combinations and a neutral gear state selectively engageable between a transmission input shaft and a transmission output shaft. The system also includes an electronic control unit for receiving a plurality of input signals to determine current operating conditions and for generating command signals, in addition to an inertia brake controlled by the electronic control unit to selectively retard engine rotation. The method includes sensing a neutral gear state which occurs after disengaging a current gear ratio and before effecting engagement of a target gear ratio, and generating a signal to automatically actuate the interia brake while the master friction clutch is engaged and engine speed is above a synchronous speed at which engagement of a target gear ratio is effected so as to increase engine deceleration and reduce the ratio changing time.

The above objects and other objects, features, and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

Figure 1:
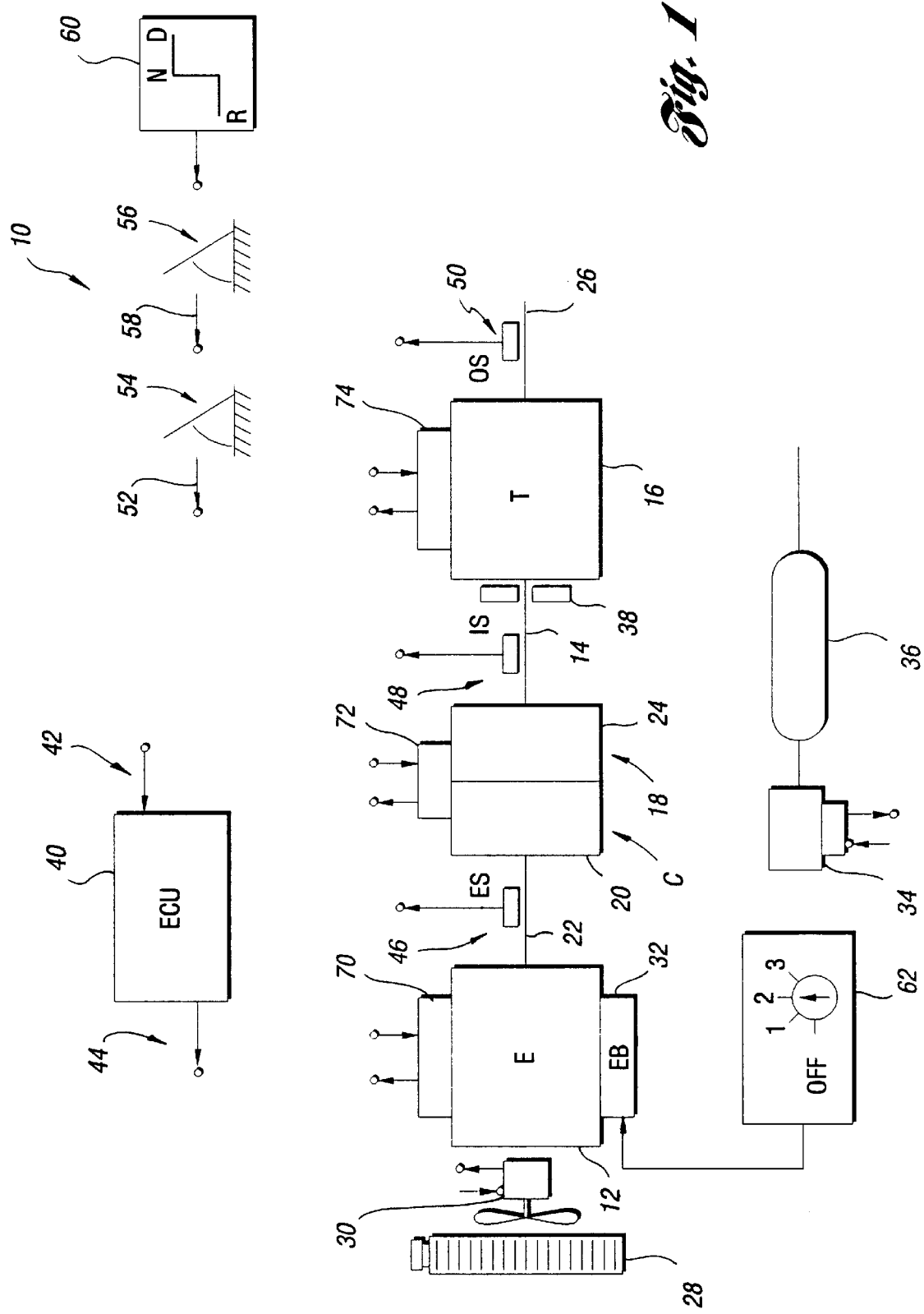
FIG. 1 is a schematic representation of a powertrain system including a mechanical transmission and engine retarding devices according to the present invention.

FIG. 1 schematically depicts a vehicular powertrain system, indicated generally by reference numeral 10. The system includes an internal combustion engine 12 which is selectively coupled to the input shaft 14 of a multiple gear change transmission 16 via a master friction clutch 18. Engine 12 may be any of a number of types of internal combustion engines, such as a diesel engine or a gasoline engine. Master friction clutch 18 includes driving elements 20 which are attached to the crankshaft 22 of engine 12, and driven elements 24 which are attached to input shaft 14. When master friction clutch 18 is engaged, substantially all the torque delivered by engine 12 is transmitted through driving elements 20 and driven elements 24 to transmission 16.

Output shaft 26 of transmission 16 is adapted to engage an appropriate driveline component (not specifically illustrated), such as a differential, drive axle, transfer case, or the like. Powertrain system 10 may also include a heat exchanger 28, such as a conventional radiator, an electrically controllable cooling fan 30, and an engine brake 32. Other components may include a hydraulic pump for power steering or other oil operated devices, an air conditioning compressor for cab climate control, an alternator for supplying electrical power, and an air compressor 34 and a compressed air storage tank 36 for powering pneumatically actuated devices or systems, such as the transmission input shaft brake 38, or the vehicle service brakes (not specifically illustrated).

Powertrain system 10 includes a number of sensors and actuators to effect control of the system as determined by the electronic control unit (ECU) 40. The various sensors provide information indicative of the current operating conditions to ECU 40 via input means 42. ECU 40 utilizes this information in executing a predetermined set of instructions, stored in a memory, to generate command signals. The command signals are relayed to the various actuators via output means 44.

Some representative sensors in communication with ECU 40 include a crankshaft sensor 46 for indicating engine speed (ES), an input speed sensor 48 for indicating transmission input speed (IS), and an output shaft sensor 50 for indicating transmission output speed (OS). Other sensors include a throttle position sensor 52 for indicating the position of throttle pedal 54, a brake-applied sensor 58 to indicate the state of service brake pedal 56 for applying the vehicle service brakes, and a gear selection indicator 60 for selecting a reverse (R), neutral (N), or drive (D) gear of transmission 16. In some applications, an additional gear selector is provided to indicate a request for an upshift or downshift. A manual engine brake selector 62 is provided for allowing manual control of the engine brake under certain operating conditions, as described below.

Powertrain system 10 also includes a number of actuators in communication with ECU 40. The actuators receive commands from ECU 40 via output means 44. Preferably, a standard communications link, such as the SAE J1922 or SAE J1939, is utilized for the actuators and sensors. The actuators may also provide feedback to ECU 40 via input means 42 to effect a closed-loop control system. Typical actuators include a fuel controller 70 for regulating the amount of fuel delivered to engine 12, and a clutch actuator 72 for engaging and disengaging master friction clutch 18. Commands from ECU 40 may also be directed to actuators through other controllers. For example, fuel controller 70 may be responsible for activating engine brake 32 upon request by ECU 40. Transmission operator 74 is operative to change the gear ratio of transmission 16 to achieve a selected gear. Transmission operator 74 also provides a signal indicative of the currently engaged gear or a neutral gear state of transmission 16.

Any of a number of known sensor types may be utilized to provide information related to the current operating conditions to ECU 40 without departing from the spirit or the scope of the present invention. Similarly, known electric, hydraulic, pneumatic, and combination actuators may be implemented to realize the present invention. Transmission system controls and actuators of the type described above may be appreciated in greater detail by reference to U.S. Pat. Nos. 4,959,986; 4,576,065; and 4,445,393, the specifications of which are hereby incorporated by reference in their entirety.

Figure 2A:
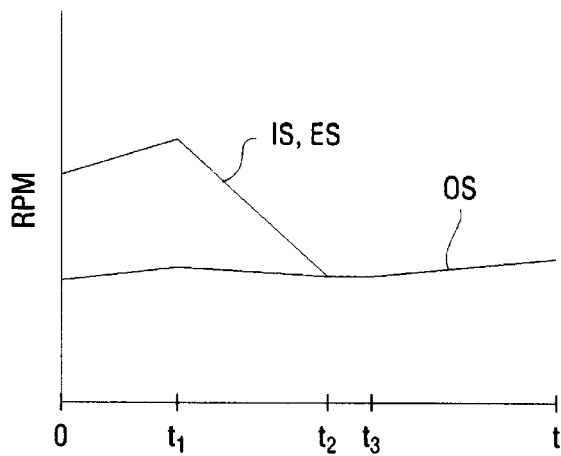
FIG. 2a is a graphical representation of a typical upshift with a master friction clutch engaged, unassisted by a retarding device.
Figure 2B:
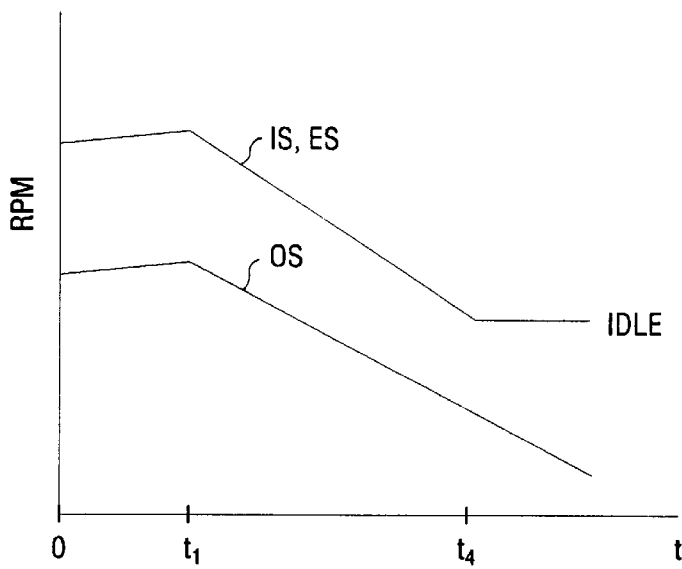
FIG. 2b is a graphical representation of an attempted upshift under demanding conditions without utilizing a retarding device.
Figure 2C:
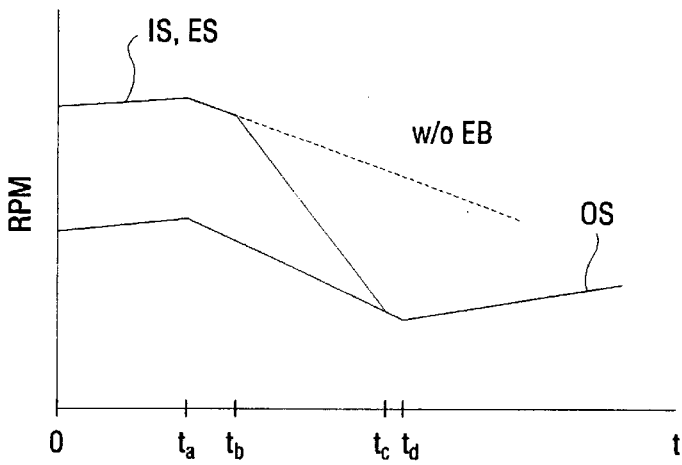
FIG. 2c is a graphical representation of an assisted upshift with a master friction clutch engaged according to the present invention.

A better understanding of the operation of the present invention will be facilitated by reference to FIGS. 2a through 2c which are graphical representations of various component rotational speeds during three different upshifts.

FIG. 2a is a graphical representation of an upshift performed by powertrain system 10 of FIG. 1 with master friction clutch 18 engaged and without utilizing a retarding force. The upshift begins at time $t_1$ where the current gear is disengaged so that transmission 16 is in a neutral gear state as indicated by transmission operator 74 or by a comparison of transmission input and output speeds. Also at time $t_1$, the engine is defuelled by fuel controller 70. Since master friction clutch 18 is still engaged, input shaft 14 is coupled to crankshaft 22 and engine speed (ES) is equal to input speed (IS). As illustrated, ES (and IS) decreases until achieving synchronous with output shaft speed (OS) at time $t_2$ (illustrations assume a target gear ratio of 1.00). Synchronous speed is achieved when $IS=OS*GR_T$, where $GR_T$ is the target gear ratio.

Since an external retarding force is not being applied, the rate at which ES decreases is the natural decay rate of the system. The natural decay rate is a function of the rotational inertia of the rotating engine, clutch, and transmission components. Also near time $t_2$, when ES is within approximately 40 RPM of synchronous, transmission operator 74 engages the selected target gear. At time $t_3$, fuel is restored to engine 12 by fuel controller 70 and the upshift has been completed.

In FIG. 2b, a graphical representation of an attempted upshift under demanding conditions, such as when ascending a steep grade, is shown. Similar to the event illustrated in FIG. 2a, at time $t_1$, transmission operator 74 disengages the current gear and indicates a neutral gear state to ECU 40 while engine 12 is defuelled by fuel controller 70. Without engine fueling, the vehicle slows down rapidly, causing OS to decrease. The natural decay rate of engine 12 is too gradual to attain synchronous before reaching engine idle speed at time $t_4$. Thus, the window of opportunity to complete the desired upshift has passed and the upshift must be aborted.

FIG. 2c is a graphical representation of an upshift performed by powertrain system 10 with master friction clutch 18 engaged while also utilizing an automatically controlled retarding device such as engine brake 32 or inertia brake 38. At time $t_a$, the current gear is disengaged, engine 12 is defuelled, and ES begins to decrease at its natural decay rate. ECU 40 generates a command signal to apply engine brake 32 when a neutral gear state is indicated at time $t_b$. The retarding device is operative to increase the decay rate of ES such that synchronous speed may be attained at time $t_c$. The target gear is engaged at time $t_c$ by transmission operator 74 in response to a command signal from ECU 40. Power to engine 12 is restored at time $t_d$ as fuel controller 70 increases the delivered fuel in response to a command from ECU 40, thereby completing the upshift. Of course, transmission gear disengagement and engagement could remain under control of the vehicle operator, and still be within the scope of the present invention.

In the case of manual control of gear engagement, at time $T_c$ fuel controller 70 would operate to maintain ES and IS at synchronous speed until transmission operator 74 indicated that the target gear had been manually engaged.

As illustrated in FIG. 1, engine brake 32 is in communication with engine brake selector 62, which provides for manual operation of engine brake 32 when descending a long grade. Typically, the engine brake is actuated when ES is above idle and throttle pedal 54 is fully released. Engine brake selector 62 could also be arranged to allow driver selection of the level of retardation to be provided during an upshift, so that zero, one, two or three banks of cylinders are activated when signaled by ECU 40. Engine brake activation could also be limited to multiple ratio upshifts only, or only when the required engine speed decay rate for an acceptable upshift exceeds a given threshold.

As previously discussed, an engine brake may be either a compression brake or an exhaust brake. In addition to conventional engine brakes, the present invention controls engine accessories to effect a modified form of applying a retarding force. By selectively energizing and de-energizing accessories such as cooling fan 30, air compressor 34, or other devices (not shown) such as hydraulic pumps, air conditioning compressors, or alternators, the load on engine 12 may be increased or decreased, respectively, so as to vary the engine speed decay rate. As previously stated, input shaft brake 38 under control of ECU 40 may be applied with the master clutch engaged to supply a retarding force operative to increase the decay rate of engine 12. Of course, any combination of the above devices, or other similar devices such as a driveline retarder, may be used together to produce a variable retarding force depending upon the particular system operating conditions.

Since various engine retarding devices, such as an engine compression brake or inertia brake, take a significant time to respond relative to the total time required for an upshift, these devices may be actuated prior to sensing a neutral gear state. For example, in FIG. 2c, the retarding device would be actuated before time $t_a$ to reduce or eliminate the time lapse between time $t_a$ and time $t_b$. The exact actuation time would depend upon the response time of the particular braking device being utilized and the details of the arrangements to ensure that the current gear will be disengaged. This strategy works particularly well with engines which revert to idle fuelling when a retarding device is activated. Reverting to idle fuelling accomplishes the throttle dip function which interrupts torque transfer through the transmission to allow disengagement of the current gear.

Response time is also considered in determining when to deactivate the retarding device. The present invention deactivates the retarding device at an appropriate time to anticipate a natural engine speed decay rate when ES will be within the synchronous window, i.e. within about 40 RPM of synchronous speed.

If the target speed for IS is below a reference value such as 200 RPM above engine idle speed, alternative synchronization methods must be implemented, such as disengaging the master clutch and actuating the input shaft brake. One situation where this occurs is in completing a stationary shift since OS is near zero so synchronous speed is below the engine idle reference speed.

The present invention also provides for various contingencies to accommodate diverse operating conditions. If the retarding device engages prior to its predicted engagement (due to a varying response time), clutch operator 72 may disengage master friction clutch 18 while the current gear is being disengaged so the shift may progress acceptably. Other alternative control sequences are initiated by ECU 40 in the event that synchronization is not being accomplished, as in the case illustrated in FIG. 2b. For example, application of the retarding force may be increased by using a combination of conventional engine braking with engine accessory loading and application of input shaft brake 38.

Typically, input shaft brakes are utilized to decelerate the input shaft of a transmission when the master friction clutch is disengaged. Thus, traditional input shaft brakes are designed to decelerate a limited rotational inertia. Therefore, utilizing input shaft brake 38 according to the present invention may require a high-capacity input shaft brake. This allows input shaft brake 38 to accommodate the rotational inertia generated by engine 12, crankshaft 22, and master friction clutch 18 so that input shaft brake 38 may be applied while master friction clutch 18 is still engaged.

Figure 3:
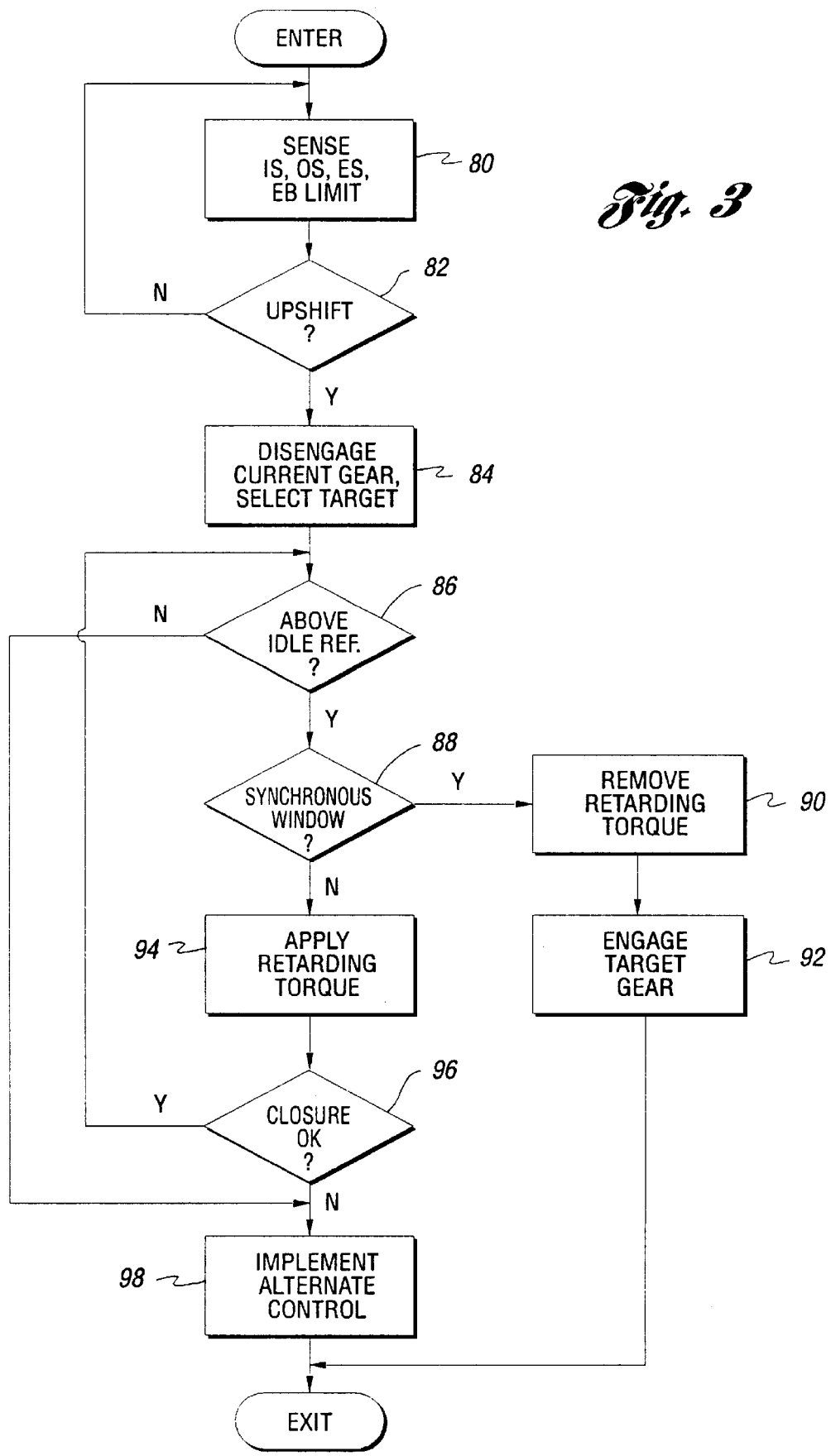
FIG. 3 is a flow chart illustrating the method of reducing ratio changing times according to the present invention.

FIG. 3 is a flowchart illustrating the method of decreasing ratio changing times according to the present invention. At step 80, the ECU gathers information from the various sensors and actuators of the system and obtains values for ES, IS, OS, and a limiting value for engine braking. If an upshift has been requested by the operator, or is indicated by the ECU, step 82 directs processing to continue with step 84. Otherwise, the process loops back to step 80.

As also shown in FIG. 3, step 84 includes disengaging the current gear and selecting an appropriate target gear. Once the current gear is disengaged, the transmission is in a neutral gear state. If ES is above an idle reference value, as determined by step 86, then a test is performed to determine if engine speed is within the synchronous window step 88. Otherwise, if ES is below idle speed, alternate control strategies are initiated by step 98 which include those contingencies discussed above. If a speed within the synchronous window has not been attained, a retarding torque is applied as indicated by step 94. This may include activating an engine compression brake, activating an input shaft brake, increasing engine accessory load, or a combination of these as previously discussed.

Still referring to FIG. 3, the closure rate between ES and synchronous speed is examined at step 96. If the closure rate is satisfactory for current operating conditions, the process continues with step 86. Otherwise, alternate control strategies are implemented by step 98. Once the synchronous speed window is attained as determined by step 88, the retarding torque is removed at step 90 and the target gear is engaged at step 92 so as to complete the upshift.

It is understood, of course, that while the form of the invention herein shown and described constitutes a preferred embodiment of the invention, it is not intended to illustrate all possible forms thereof. It will also be understood that the words used are descriptive rather than limiting, and that various changes may be made without departing from the spirit or scope of the invention as claimed below.

What is claimed is:

1. A method for reducing ratio changing time in a mechanical powertrain system including an engine coupled via a master friction clutch to a mechanical change gear transmission having a plurality of gear ratio combinations and a neutral gear state selectively engageable between a transmission input shaft and a transmission output shaft, the system also including an electronic control unit for receiving a plurality of input signals to determine current operating conditions and for generating command signals, the system further including an inertia brake controlled by the electronic control unit to selectively retard engine rotation, the method comprising:

sensing a neutral gear state which occurs after disengaging a current gear ratio and before effecting engagement of a target gear ratio; and generating a signal to automatically actuate the inertia brake while the master friction clutch is engaged and engine speed is above a synchronous speed at which engagement of a target gear ratio is effected so as to increase engine deceleration and reduce the ratio changing time.

2. The method of claim 1 wherein the system further includes an engine brake selectively operable by the electronic control unit, the method further comprising actuating the engine brake in combination with the inertia brake to further reduce the ratio changing time.

3. The method of claim 1 wherein the plurality of input signals indicates at least a transmission input speed and a transmission output speed and wherein the step of sensing a neutral gear state comprises determining the neutral gear state based on the input speed and the output speed.

4. The method of claim 1 wherein the plurality of input signals indicates engine speed, the method further comprising:

monitoring closure rate at which the engine speed approaches the synchronous speed; and controlling application of the inertia brake based on the closure rate.

5. A system for reducing ratio changing time for a mechanical powertrain including an engine coupled via a master friction clutch to a mechanical change gear transmission having a plurality of gear ratio combinations and a neutral gear state selectively engageable between a transmission input shaft and a transmission output shaft, the system comprising:

an inertia brake actuable to provide a retarding torque to the engine via the transmission input shaft;

an actuator for selectively controlling engagement and disengagement of the master friction clutch; and an electronic control unit in communication with the inertia brake and the actuator, the electronic control unit receiving a plurality of input signals indicative of current operating conditions, determining when the master friction clutch is engaged, sensing a neutral gear state while the master friction clutch is engaged, and generating a command signal to actuate the inertia brake while the master friction clutch is engaged and engine speed is above a synchronous speed at which engagement of a target gear ratio is effected to increase engine deceleration and reduce the ratio changing time.

6. The system of claim 5 further comprising:

an engine brake in communication with the electronic control unit for providing an additional retarding torque to the engine, wherein the electronic control unit generates a signal to actuate the engine brake while the master friction clutch is engaged and the engine speed is above the synchronous speed to further reduce the ratio changing time.

7. The system of claim 5 further comprising:

a sensor in communication with the electronic control unit for generating a signal indicative of a neutral gear state occurring after disengaging a current gear ratio and before effecting engagement of the target gear ratio.

* * * * *